United States Patent Office 3,397,400
Patented Aug. 13, 1968

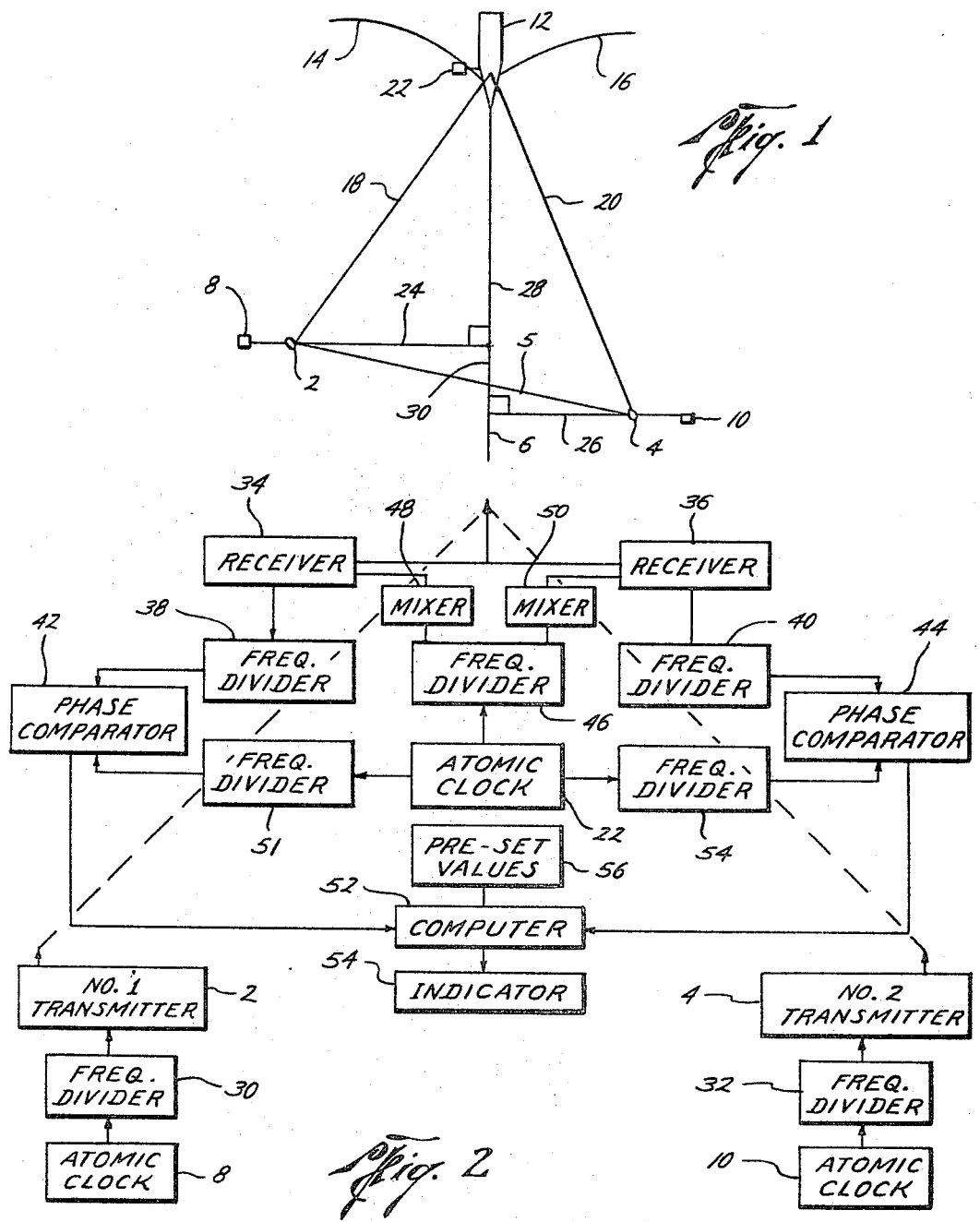

3,397,400
METHOD AND APPARATUS FOR
RADIO NAVIGATION
Hans W. Maass, Gehrden, and Friedhelm K. Sender, Hannover, Germany, assignors to Prakla Gesellschaft fur Praktische Lagerstattenforschung G.m.b.H., Hannover, Germany, a corporation of Germany
Filed Nov. 10, 1966, Ser. No. 593,392
Claims priority, application Germany, Nov. 13, 1965,
P 38,119
13 Claims. (Cl. 343—112)

ABSTRACT OF THE DISCLOSURE

Radio navigation system including two fixed transmitter stations and a receiver on a vehicle traveling a predetermined course with respect to the two stations. Atomic clocks are utilized in the transmitters and receiver to accurately maintain frequency and phase. Computing means in the receiver determines the distance of the receiver to each transmitter and indicates if the vehicle is off course. The bandwidth for the transmitters may be only a few cycles.

---

This invention relates to methods and apparatus for aerial and marine navigation, and more particularly relates to improved navigation methods and apparatus employing two radio transmitting stations and one receiving station.

It is well known to detect radio signals from three or more transmitting stations having known locations, and to determine therefrom the location of the point at which such signals are received. For example, see the hyperbola-location systems disclosed in U.S. Patents Nos. 2,943,320 and 3,019,435, wherein the distances between the point of reception and each transmitter are determined by phase comparison of the frequencies of the transmitted signals. More particularly, the distances are determined by evaluating the phase relationship of the signals generated by the transmitting stations together with other signals transmitted at differential and auxiliary frequencies.

In these systems of the prior art, the auxiliary frequencies are either superimposed as low frequency modulation products on the carriers of the transmitting stations, or they may be transmitted separately and independently. In any event, a complete system of the type disclosed by the prior art necessarily employs a relatively broad bandwidth of frequencies. Moreover, elaborate and complex instrumentation is required, especially at the point of reception or receiving station, for determining the relative phase relationship of the transmitted frequencies. Since the receiving equipment must be made responsive to a broad range of frequencies or to multiple frequencies it is exceedingly difficult, if not impossible, to exclude unwanted interfering frequencies.

In U.S. Patent No. 2,947,984, there is disclosed a system employing only two fixed transmitting stations, and employing phase detection equipment at the reception point for phase comparison of the concentric waves from the transmitters as well as for evaluation of the sums or differences of the elliptical or hyperbolic curves having the transmitters as foci. This system differs from the present invention, however, in that it requires simultaneous radiation of harmonics and modulated carrier waves for the purpose of fixing the phase relationship of the primary frequency sought to be detected, and requires a third transmitter at the point sought to be located.

Other navigation systems are known, wherein the travel times of the signals generated by the transmitting stations are measured by means of transmission of single pulses between each transmitter and the point sought to be located. In such a system, the sequence of the pulses is controlled by crystal clocks having predetermined frequencies. A system such as this has shortcomings, however, since such a system requires the use of one or more bands in the radio wave band, and authorization to use that much of the broadcast spectrum is difficult to obtain. Moreover, since the system operates with pulse-modulated signals, it is highly susceptible to static.

These disadvantages of the prior art are overcome with the present invention, wherein novel methods and apparatus are provided which employ only two transmitting stations and a single receiving station, and which provides an accurate indication of position as well as a simple indication of deviation or departure from a predetermined course of travel. The advantages of the present invention are preferably attained by generating a first signal of a preselected frequency at a first preselected location, generating a second signal of a preselected different frequency, receiving said first and second signals at said location to be determined, and in response to each of said received signals deriving an indication of the distance from said receiving point to the corresponding transmitting station. Since the location of each transmitting station and the predetermined course of travel are known, the "normal" or shortest distance between the course and each transmitter may be conveniently pre-calculated from standard charts in a conventional manner. Accordingly, conventional methods and apparatus may be used to compute, using the pre-calculated normals, the location and distance along the course of the receiving point from the intersection of each normal with the course. If the receiving point is not on the course, the two computed distances will, of course, be different. Thus, a simple indication is provided for steering to the course, and for determining the location of the ship or aircraft with respect to the course.

It is essential to the accuracy of the aforementioned method and system, that the distances between the receiving point and each transmitter station be accurately determined. Thus, it is preferable to utilize synchronized atomic clocks at each transmitting station, and at the receiving station, to provide from transmitter output (and receiver reception) at a high accuracy with respect to frequency. These clocks maintain the phase position of the transmitter frequencies at a very high level of fixity and dependability, and also provide a very accurate reference for time measurement at the receiving station. The transmitting stations each generate one unmodulated fixed frequency, and thus only two single frequencies of a bandwidth of one oscillation per second need be provided for operating the entire system.

The bandwidth necessary for operating the system of the present invention may be further restricted by selecting the frequencies of the transmitter signals within a bandwidth of only a few cycles. Inasmuch as the output signals from the transmitter stations are generated at fixed frequencies and at a constant output, the selectivity of the receiving equipment may be correspondingly improved without difficulty.

It is a feature of the present invention to control the intermediate frequency of the receiver station by means of an atomic clock.

It is another feature of the present invention to provide for low sensitivity to unwanted interfering signals and noise by providing a relatively narrow bandwidth.

It is a further feature of the present invention to utilize relatively simple, automatically operating equipment at the transmitting stations, and at the receiving station in the ship, airplane, etc.

It is also another feature of the present invention to utilize an atomic clock to control the receiving station, whereby deviation of the ship, airplane, etc. from the predetermined course may be indicated immediately by means of a simple computer, according to the following equation:

$$\sqrt{X_1^2 - a^2} = \sqrt{X_2^2 - b^2} - e$$

wherein $X_1$ and $X_2$, respectively, are the distances between the receiving station and the first and second transmitting stations, wherein $a$ and $b$ are the lengths, respectively, of the normals between the predetermined course and the first and second transmitting stations, and wherein $e$ is the distance between the points of intersection of the two normals with the predetermined course.

It is also a further feature of the present invention to provide in a receiving station a first receiving channel having a first phase detector or comparator coupled to receive both the signal from the first transmitter and the output signal from an atomic clock (after appropriate dividing or multiplying of the respective signal frequencies) and a second receiving channel having a second phase detector or comparator coupled to receive both the signal from the second transmitter and the output signal from the atomic clock (after appropriate dividing or multiplying of the respective signal frequencies). It is preferable that the output signal from the phase detectors or comparators be provided in units indicating multiples of 360 degrees.

These and other advantages and features of the present invention will be apparent from the following detailed description, wherein reference is made to the following figures in the accompanying drawing.

In the drawing:

FIG. 1 is a functional representation of a predetermined course, two preselected transmitter stations, and a receiving station at a point sought to be located, including a geometric representation of the parameters necessary to be determined in order to locate the receiving point.

FIG. 2 shows a functional representation of the basic components in a preferred embodiment of the present invention.

Referring now to FIG. 1, there may be seen a representation of a first transmitting station 2 having a known predetermined geographic location, a second transmitting station 4 also having a known predetermined geographic location, and a predetermined (and therefore known) course 6 of travel for a ship, airplane, or other moving object 12. It may be seen that an atomic clock 8 is connected to preselect the frequency of the output signal from the first transmitter 2, and that a second atomic clock 10 is similarly connected to similarly control the frequency of the output from the second transmitter station 4. It is preferable that clock 10 is synchronized with clock 8.

Let it be assumed that it is sought to steer the ship 12 along the predetermined course 6 without deviation or departure therefrom. The ship 12 is located at the point of intersection of arcs 14 and 16, which represent the concentric wave fronts of the output signals from the first and second transmitter stations 2 and 4, respectively, as they are simultaneously detected at the ship 12, and that radii 18 and 20 are accordingly representative of the distances, respectively, of the ship 12 from the first and second transmitting stations 2 and 4. As will hereinafter be apparent, the lengths of radii 18 and 20 may be determined by phase comparison of the frequency of the output signal from a third atomic clock 22 (which is preferably synchronized with clocks 8 and 10) and the frequencies of the output signals generated by the transmitter stations 2 and 4.

As hereinbefore stated, the exact geographic positions or locations of the predetermined course 6 and the transmitter stations 2 and 4 are known or predetermined. Thus, the length (distance) of the normals 24 and 26 between the transmitters 2 and 4, respectively, and the course 6, may be determined on the chart by conventional methods and apparatus. Moreover, the length of $e$ (hereinbefore identified) may be similarly determined.

It may thus be seen that normals 24 and 26 form two right triangles, one having as sides normal 24, radius 18, and the distance 28 along course 6 of the ship 12 from the point of intersection of normal 24 and course 6. The other right triangle may be seen to have as sides the other normal 26, radius 20, and the sum of distance 28 and distance 30 (the distance between the two points of intersection of normals 24 and 26 with course 6).

It will therefore be apparent that, if radius 18 can be measured, it will thereafter be a simple matter to determine the location of ship 12 by computing the length of distance 28 according to the relationship $\sqrt{X_1^2 - a^2}$, wherein $X_1$ is the length of radius 18, and wherein $a$ is the length of normal 24. Distance 28 may also be computed according to the relationship $\sqrt{X_2^2 - b^2} - e$, wherein $X_2$ is the length of radius 20, $b$ is the length of normal 26, and $e$ is the predetermined distance between the points of intersection of normals 18 and 20 with course 6.

It will be apparent that, if the ship 12 is on course 6, the computed distance 28 will be the same when computed according to the relationship $\sqrt{X_2^2 - b^2} - e$, as when computed according to the relationship $\sqrt{X_1^2 - a^2}$. On the other hand, it will also be apparent that if the ship 12 is not on course, the computed distance 28 will be different to the extent that the actual location of the ship 12 is off course. Thus, a conventional computer can be employed as hereinafter described in detail to determined the difference between the above-mentioned two radicals. The magnitude of the computed difference will obviously provide the distance which the ship 12 has deviated from course 6, and the direction (whether to the right or left) of such deviation will be indicated by whether the computed difference is positive or negative. Conventional indicating means may be provided to continually utilize this computed difference to provide a continuous indication of how closely the ship 12 is being steered along course 6.

Referring now to FIG. 2, there may be seen a functional representation of the major components of a preferred embodiment of the present invention. In particular, the No. 1 transmitting station 2 may be seen to be controlled by the atomic clock 8, in that the output signal from clock 8 is applied to a frequency divider 30 having its output signal connected to control the frequency of the output signal from the No. 1 transmitter 2. A second atomic clock 10 may be seen to similarly control the output frequency of the No. 2 transmitter station 4 by way of a frequency divider 32.

The receiver station located in the ship 12 (or airplane) depicted in FIG. 1, may be seen in FIG. 2 to include a first receiver circuit 34 adapted to detect the output signal from the No. 1 transmitting station 2, and a second receiver circuit 36 adapted to detect the output signal from the No. 2 transmitting station 4. The output signal from the first receiver circuit 34 is applied to a conventional frequency divider 38 having its output connected to a phase comparator circuit 42. The output signal from the second receiver circuit 36 is similarly connected to a conventional frequency divider 40 having its output similarly connected to a phase comparator circuit 44.

A third atomic clock 22 is included with its output signal connected through a frequency divider 42 to a mixer 48 which provides the intermediate frequency signal for the first receiver circuit 34, and to a second mixer 50 which provides the intermediate frequency signal for the second receiver circuit 36. As may also be seen in FIG. 2, the output signal from the third atomic clock 22 is also applied through another frequency divider 51 to the first phase comparator circuit 42, and through another different frequency divider 54 to the second phase comparator circuit 42.

The output signal from the phase comparator circuit 42, which may be a direct indication of the frequency differential between the frequency of the output from the third atomic clock 22 and the frequency of the output signal from the No. 1 transmitting station 2, may be derived as a direct indication of the length or magnitude of the radius 18. Similarly, the output signal from the second phase comparator circuit 44, which may be a direct indication of the phase differential between the frequency of the output from the clock 22 and the frequency of the output signal from the No. 2 transmitting station 4, may also be derived as a direct indication of the length or magnitude of the radius 20. In this respect, it should be noted that the frequency of the output signal from the clock 22 may be equal to the output signals from the No. 1 and No. 2 transmitting stations 2 and 4, or it may be an integral or integral fraction thereof. The No. 1 and No. 2 transmitting stations 2 and 4 preferably generate continuous output signals, and therefore these signals are preferably different in frequency. However, cycling means may be provided whereby the No. 1 and No. 2 transmission stations 2 and 4 generate intermittently during alternate time intervals, and in such a case the frequencies of their output signals may be equal. In any event, it is preferable that both the first and second phase comparator circuits 42 and 44 include circuits, whereby it may be indicated when the frequency differential between the output signal from the clock 22 and the output signals from either transmitting station, 2 and 4, is greater than 360 degrees.

As may also be seen in FIG. 2, a suitable computer 52 may be included for determining from the outputs from the phase comparator circuits 42 and 44 the magnitude of any deviation of ship 12 from course 6, and suitable indicating means 54 may also be included to indicate the direction of such deviation. Suitable preset means 56 may also be included for applying data to the computer 52 for registering on the computer 52 the functional equivalent of course 6, and the lengths of the aforementioned normals.

Although it is expected that the transmitting stations 2 and 4 be composed of equipment especially constructed and installed for purposes of the present invention, it should be understood that fixed broadcasting transmitting stations may be employed for these purposes. However, it is necessary that such stations generate carrier frequencies which are controlled synchronously by atomic clocks, or their equivalent, as hereinbefore described with respect to the No. 1 and No. 2 transmitting stations 2 and 4 depicted in FIGS. 1 and 2.

Numerous other modifications and variations may obviously be made in the methods and apparatus depicted and described herein without departing substantially from the concept of the present invention. Accordingly, it should be clearly understood that the forms of the present invention which are described herein, and which are depicted in the accompanying drawing, are illustrative only, and are not intended as limitations on the scope of the invention.

What is claimed is:

1. A radio navigation system for locating a position relative to a predetermined course, said system comprising:
   a first transmitting station located at a first fixed location relative to said predetermined course and generating a first signal of a first preselected fixed frequency,
   a second transmitting station located at a second different fixed location relative to said predetermined course and generating a second signal of a second preselected fixed frequency,
   a receiving means to receive said signals generated by said transmitting stations, and
   computing means for deriving from said received signals a third signal functionally related to the position of said receiving means relative to said predetermined course, said computing means including first distance determining means for generating a first indicating signal functionally related to the distance between said first transmitting station and said receiving means, and second distance determining means for generating a second indicating signal functionally related to the distance between said second transmitting station and said receiving means.

2. The system described in claim 1, wherein said first and second signals are continuous and said first preselected frequency is different from said second preselected frequency.

3. The system described in claim 1, wherein said first transmitting station and said second transmitting station transmit intermittently during alternate time intervals, and wherein said first preselected fixed frequency and said second preselected fixed frequency are at the same frequency.

4. The system described in claim 1, wherein said computing means further includes
   first deriving means for deriving a first locating signal functionally related to the square root of the difference between the square of the distance between said first transmitting station and said receiving means and the square of the shortest distance between said first transmitting station and said predetermined course, and
   second deriving means for deriving a second locating signal functionally related to the square root of the difference between the square of the distance between said second transmitting station and said receiving means and the square of the shortest distance between said second transmitting station and said predetermined course.

5. A method of navigating a moving vehicle along a predetermined course and locating the position of said vehicle relative to said course, said method comprising
   generating at a first fixed location relative to said predetermined course a first signal of a first preselected fixed frequency,
   generating at a second fixed location relative to said predetermined course a second signal of a second preselected frequency,
   receiving said first and second signals at a third location and deriving therefrom an indication of the position of said third location relative to said course,
   generating a first indicating signal functionally related to the distance between said first location and said third location, and
   generating a second indicating signal functionally related to the distance between said second location and said third location.

6. The method described in claim 5, wherein said first and second signals are continuous and said second preselected frequency is different from said first preselected frequency.

7. The method described in claim 5, wherein said steps of generating first and second continuous signals are intermittent during alternate time intervals.

8. The method described in claim 5, including the steps of
   determining the distance between said first location and the point on said predetermined course which is closest to said first location,
   determining the distance between said second location and the point on said predetermined course which is closest to said second location,
   generating a first calculating signal functionally related to the distance between said third location and said point on said predetermined course which is closest to said first location, and
   generating a second calculating signal functionally related to the distance between said third location and said point on said predetermined course which is closest to said second location.

9. The method described in claim 8, including the step of
   comparing said first and second calculating signals.

10. The method described in claim 9, including the step of
- determining the distance between said point on said predetermined course closest to said first location and said point on said predetermined course closest to said second location, and
- wherein said step of comparing said first and second calculating signals includes the steps of
  - generating a third calculating signal functionally related to the difference between the distance between said third location and said point on said course closest to said second location and the distance between said point on said course closest to said first location and said point on said course closest to said second location, and
  - deriving the difference between said first and third calculating signals.

11. The method described in claim 10, including the step of
- generating an electrical indication of the difference between said first and third calculating signals which is functionally related in magnitude and polarity to the magnitude and direction of displacement of said third loaction from said predetermined course.

12. The method described in claim 11, including the step of
- steering said vehicle in a direction such that said electrical indication of the difference between said first and third calculating signals is substantially zero in magnitude and polarity.

13. Apparatus for navigating a vehicle along a predetermined course and for determining the location of said vehicle relative to said course, said apparatus comprising
- a first transmitting station disposed at a first predetermined location, said first transmitting station including
  - a first atomic clock adapted to generate a first clock signal having a first preselected frequency, and
  - a first signal generator responsive to said first clock signal to generate a first locating signal of said first frequency;
- a second transmitting station disposed at a second predetermined location, said second transmitting station including
  - a second atomic clock adapted to generate a second clock signal having a second different preselected frequency which is an integral of said first clock signal, and
  - a second signal generator responsive to said second clock signal to generate a second locating signal of said second preselected frequency; and
- a receiving station in said vehicle for receiving said first and second locating signals, said receiving station including
  - a third atomic clock adapted to generate a third clock signal having a third preselected frequency which is an integral of one of said first and second preselected frequencies,
  - first receiver means responsive to said first locating signal and generating a first indicating signal functionally related thereto,
  - second receiver means responsive to said second locating signal and generating a second indicating signal functionally related thereto,
  - a first phase comparison means responsive to said first indicating signal and said third clock signal and generating therefrom a first distance signal functionally related to the distance between said first transmitting station and said vehicle,
  - a second phase comparison means responsive to said second indicating signal and said third clock signal and generating therefrom a second distance signal functionally related to the distance between said second transmitting station and said vehicle, and
  - computing means responsive to said first and second distance signals for computing the distance between said vehicle and the point on said course closest to said first transmitting station as a function of said first distance signal and for computing the distance between said vehicle and the point on said course closest to said second transmitting station as a function of said second distance signal.

References Cited
UNITED STATES PATENTS

| | | | |
|---|---|---|---|
| 2,794,594 | 6/1957 | Ergen et al. | 235—150.27 |
| 3,150,372 | 9/1964 | Groth | 343—112 |
| 3,302,203 | 1/1967 | Schauffler | 343—112 |

RODNEY D. BENNETT, *Primary Examiner.*

RICHARD E. BERGER, *Assistant Examiner.*